Figure 1:
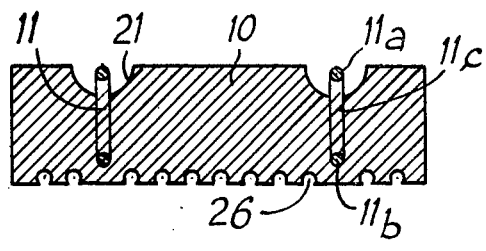

United States Patent [19]

Joannes

[11] 4,157,640
[45] Jun. 12, 1979

[54] PREFABRICATED BUILDING PANEL

[76] Inventor: André A. Joannes, Boulevard Olivier de Serres, F-30400 Villeneuve-les-Avignon, France

[21] Appl. No.: 823,275

[22] Filed: Aug. 10, 1977

[51] Int. Cl.² ............................................. E04C 2/22
[52] U.S. Cl. .............................. 52/309.7; 52/309.12; 52/584
[58] Field of Search ............ 52/309.12, 309.16, 309.4, 52/723, 309.5, 309.7, 320, 321, 325, 327, 405, 577, 576, 600

[56] References Cited

U.S. PATENT DOCUMENTS

| 1,377,149 | 5/1921 | Hadland | 52/600 |
|---|---|---|---|
| 1,627,000 | 5/1927 | Yeager | 52/723 |
| 1,719,782 | 7/1929 | Roberts | 52/444 |
| 3,305,991 | 2/1967 | Weismann | 52/309.7 |
| 3,579,937 | 5/1971 | Lukens | 52/309.8 |
| 3,679,529 | 7/1972 | Prusinski | 52/309.7 |
| 3,791,912 | 2/1974 | Allard | 52/309.7 |
| 3,879,908 | 4/1975 | Weismann | 52/309.12 |
| 3,885,369 | 5/1975 | Ott | 52/723 |
| 3,930,348 | 1/1976 | Wise | 52/600 |

FOREIGN PATENT DOCUMENTS

| 997118 | 9/1976 | Canada | 52/309.7 |
|---|---|---|---|
| 2250611 | 4/1973 | Fed. Rep. of Germany | 52/309.7 |
| 2035358 | 8/1973 | Fed. Rep. of Germany | 52/600 |
| 2250873 | 6/1975 | France | 52/320 |
| 706855 | 5/1966 | Italy | 52/322 |
| 685893 | 1/1953 | United Kingdom | 52/587 |

*Primary Examiner*—John E. Murtagh
*Attorney, Agent, or Firm*—Eyre, Mann, Lucas & Just

[57] ABSTRACT

The invention relates to a prefabricated building panel which may be used in particular as a flooring element. The prefabricated building panel is constituted by a block of insulating material, particularly an expanded polymer material and a framework formed of at least one stiffener or bearer element, joined to the insulating material to form a self-bearing insulating panel without a thermal bridge.

According to the invention, the panel comprises at least one stiffener element embedded in the block of insulating material.

The invention also includes a process suitable for making this panel.

9 Claims, 17 Drawing Figures

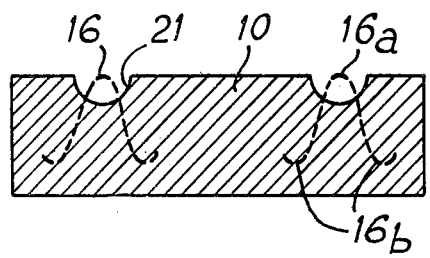
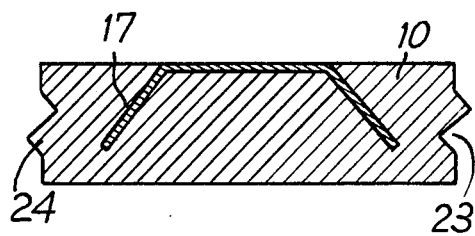
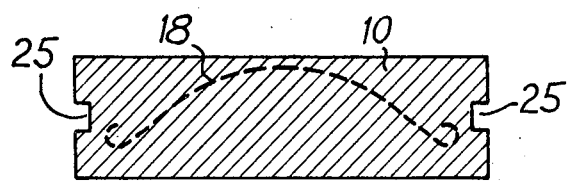
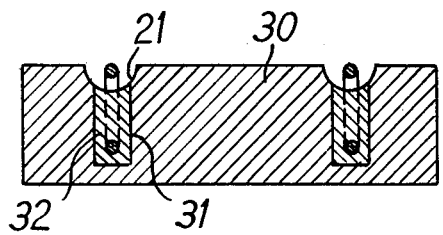
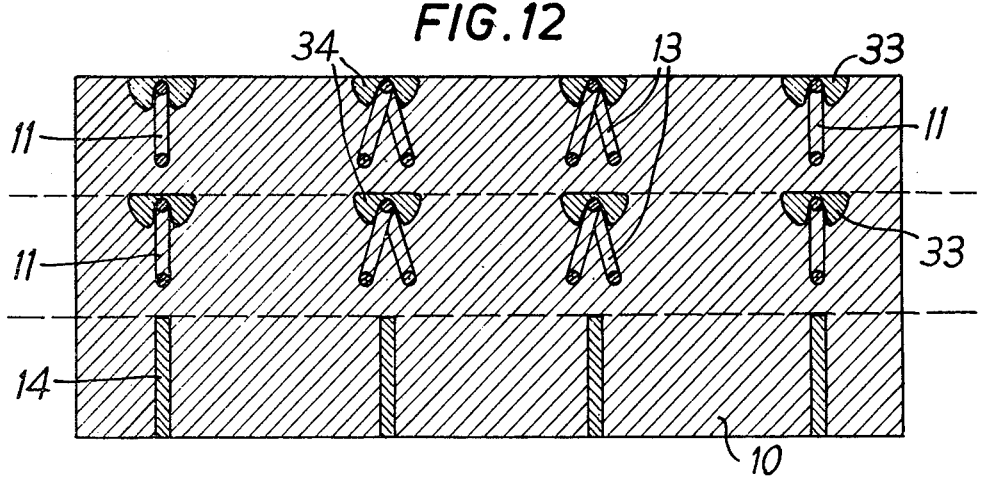

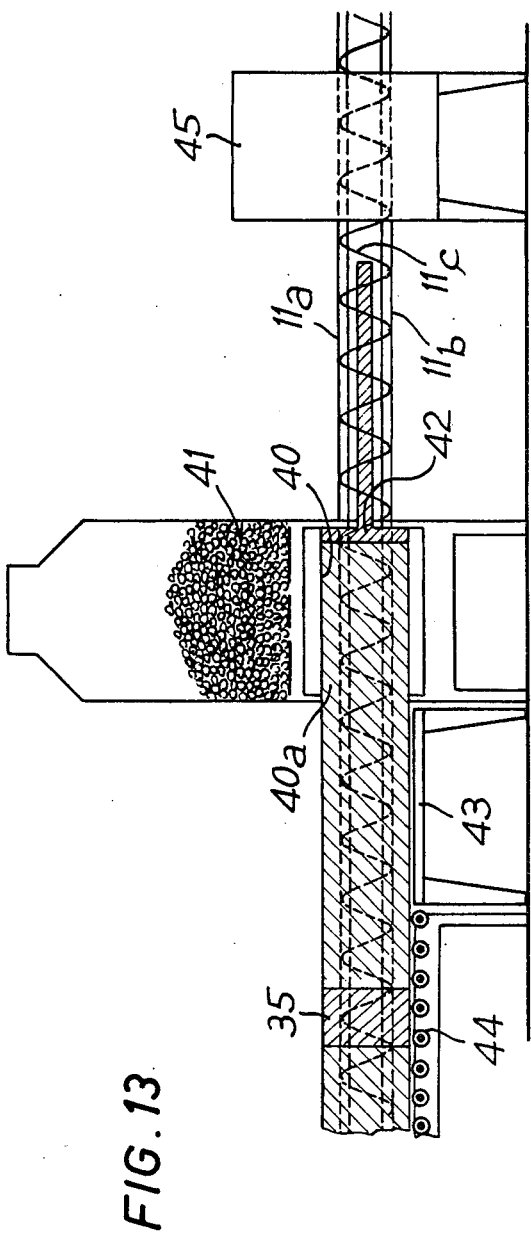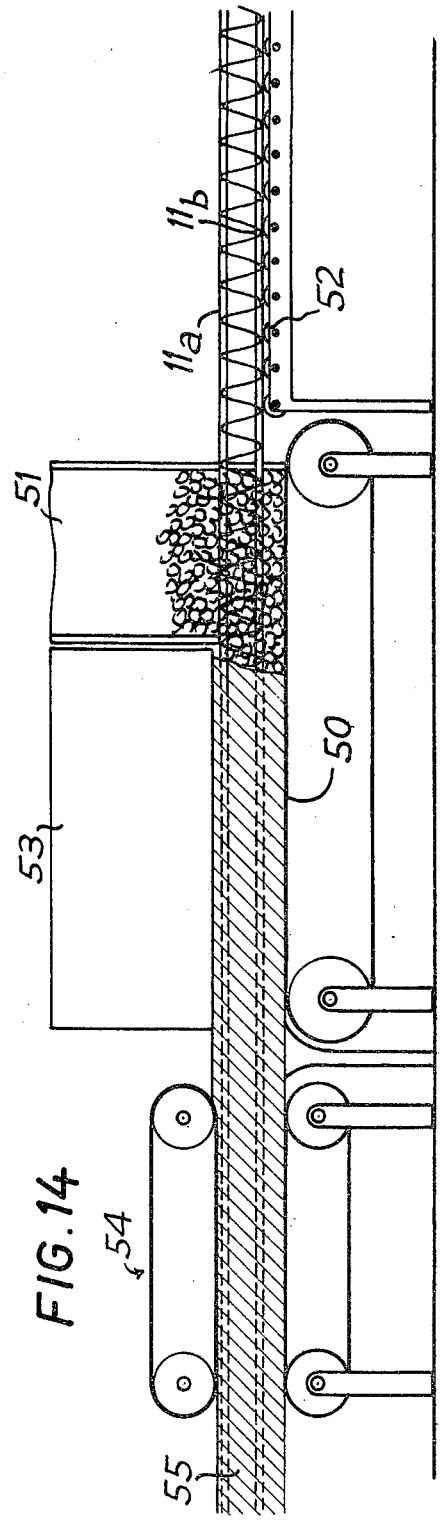
FIG. 13
FIG. 14

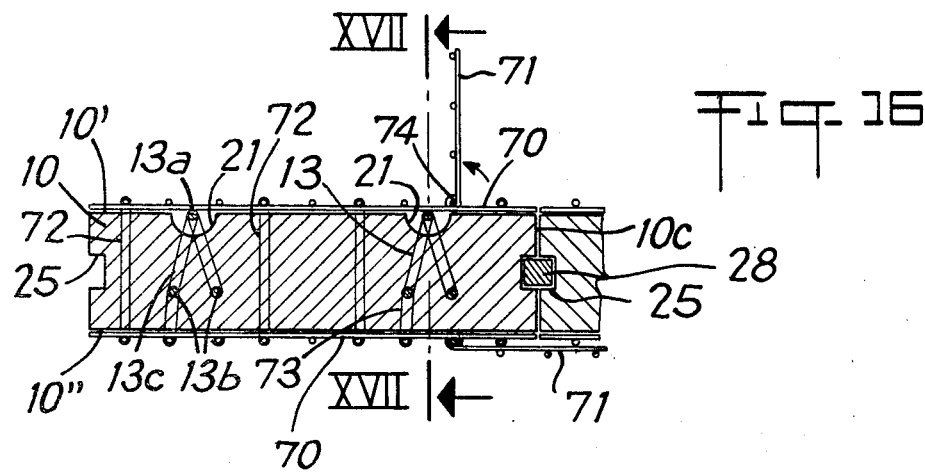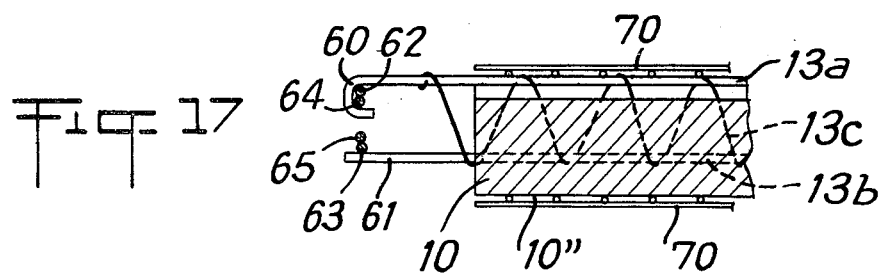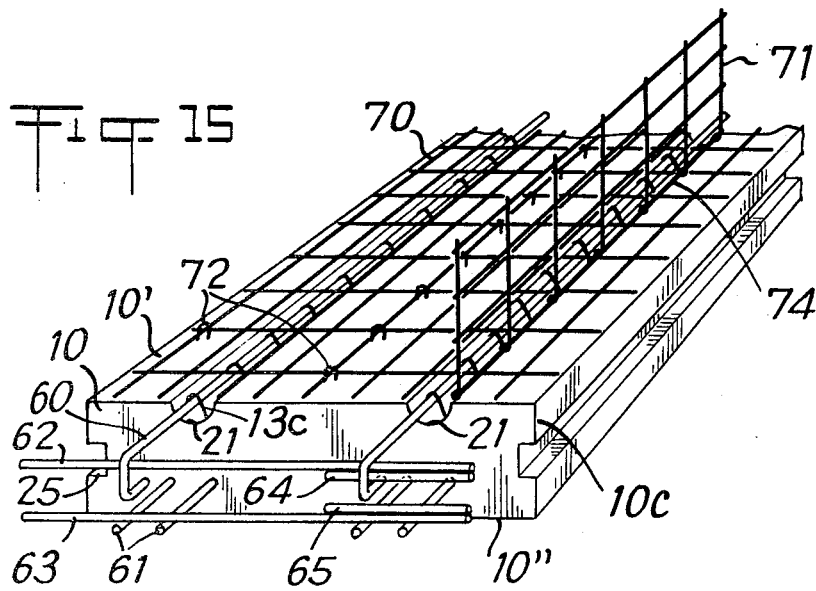

PREFABRICATED BUILDING PANEL

The present invention relates to a prefabricated building panel usable particularly as a floor element, but which may also be used for roofing, terraces and walls. The invention relates also to a process for making such a panel.

The invention applies essentially to the field of building construction. The panels according to the invention may also be advantageously used in the construction of ceilings and walls of particular rooms, particularly rooms to be thermally insulated such as, for example, refrigerated rooms.

It is well known to make floors by means of beams, for example in concrete, and case-bays made up of blocks of insulating material, a concrete slab being subsequently cast. These types of floor do not permit obtaining perfect insulation, on account of the thermal bridges existing at beam level, and require intricate handling and a fairly lengthy period for their assembly on site. It has indeed been proposed, to improve thermal insulation, to form the case-bays in such a manner that each of them comes under a beam alongside which it is placed in position. However, this solution facilitates neither the making of the case-bays nor their assembly.

It has also been proposed, particularly in French Pat. No. 2,096,973 to make building elements comprising a core or body of cellular material and a reinforcement body made up of reinforcing irons. In this case, the reinforcing irons are situated at the junction between a face of the core and a coating, or skin, of fibre-reinforced resin, which covers the core and connects the reinforcement with the core. The indispensable presence of such a coating makes the constructional element not very adequate for being covered, for example, by a concrete slab, and complicates manufacture as three essential constituent elements are required, i.e., a core, a reinforcement and a coating.

The present invention aims at providing a prefabricated building panel which associates considerable ease of transport, handling and utilisation with a better thermal insulation, while retaining the necessary mechanical properties.

This aim is achieved by a panel which is formed of a block of insulating material, particularly an expanded polymer material, and a framework formed of at least one stiffener or bearer element, connected with the insulating material to form a self-bearing insulating panel without a thermal bridge, which panel, according to the invention, comprises at least one stiffener element embedded in the block of insulating material.

The present invention, therefore, permits having available panels, particularly for floors, which may be used direct, which are light, easy to handle and quick to place in position, as no assembly is involved. Such self-bearing panels are particularly suitable to be used on small sites which do not have substantial hoisting means available. For normal bearing capacities, the panel in accordance with the invention can make it possible, with reinforced stiffeners, and by virtue of its lightness, to obtain a floor not requiring any staying, which is very advantageous, particularly in the case of inaccessible sanitary gaps. Additional reinforcement may be provided at the ends with a view to providing a greater resistance to shearing stresses.

The stiffeners may be formed of metal reinforcements, sections, tubes, perforated sheet metal, stamped or folded metal sheets, concrete irons, sections of glass-fibre reinforced plastics, bamboo, timber, plywood, boxes, etc. The insulating material is a light expanded material, solid or cellular, for example polystyrene. According to a peculiarity of the panel according to the invention, the framework has elements, known as compression elements, which are not coated with insulating material.

The present invention also has for its object to provide a process permitting rapid and inexpensive manufacture of the said panels.

This aim is achieved through a process in which, according to the invention, the element(s) forming the said framework is (are) introduced into a moulding device and the said insulating material is moulded around the framework. Preferably, the element(s) constituting the said framework is (are) introduced through a side access of the moulding device continuously or section by section, and the panel is extracted continuously or section by section from the moulding device through an outlet situated opposite the said lateral access.

According to a peculiarity of the process in accordance with the invention, at least part of the said framework is masked before moulding in such a manner as not to be coated with insulating material.

According to an alternative of the process in accordance with the invention an insulating block is formed with at least one open recess or groove, at least one framework element is placed in each recess and a filler is introduced, particularly an expanded insulating material in said recess to immobilise permanently the said element in same.

Other peculiarities and advantages of the building panel according to the invention and its manufacturing process will become clearer on reading the description, given hereinafter for the sake of indication, but non-limitatively, with reference to the attached drawings which illustrate:

FIGS. 1 to 11: cross-sectional views of several methods of embodiment of a panel according to the invention;

FIG. 12: a cross-sectional view of a moulded block for the production of panels in accordance with the invention;

FIG. 13: a diagrammatic elevation and cross-sectional view of an installation for the semi-continuous production of panels in accordance with the invention;

FIG. 14: a diagrammatic elevation and cross-sectional view of an installation for the continuous production of panels in accordance with the invention;

FIG. 15: a perspective view of a panel according to a particular method of embodiment of the invention;

FIG. 16: a cross-sectional view of a panel according to the invention provided with lattice reinforcements, and FIG. 17: a partial view in longitudinal section along plane XVII-XVII of FIG. 16, of a panel according to the invention provided with latticed reinforcements and tie-iron caps.

Several methods of embodiment of a panel in accordance with the invention are represented for the sake of example in FIGS. 1 to 10.

The solid 10 or cellular 10a insulating material (FIG. 6) is preferably expanded polystyrene.

Figure 2:
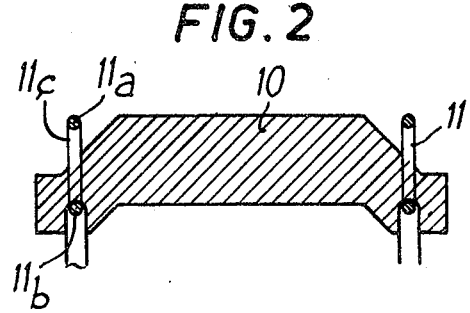

The panel may have a substantially parallelepipedic shape, or a box shape (FIG. 2).

Figure 5:
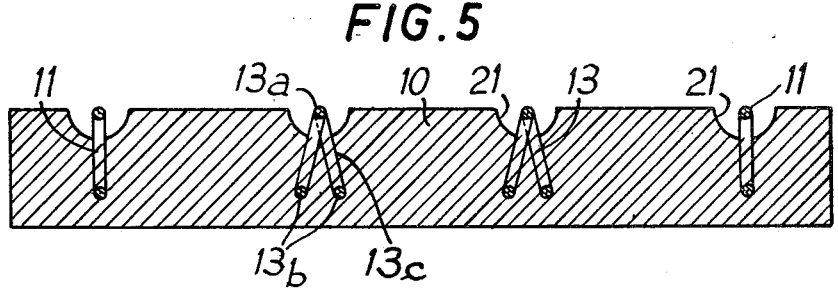

The framework of the panel is constituted by one or more stiffener or bearer elements, according to the shape of the latter (FIGS. 9, 10) and the size of the panel (FIG. 5).

Figure 3:
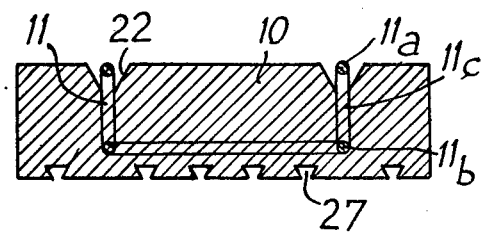
Figure 4:
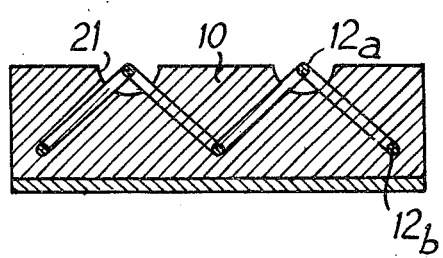

The stiffener elements may each be constituted by metal sections of the type used to form the reinforcements of concrete beams. Thus, there may be seen in FIGS. 1, 2, 3 and 5 stiffener elements 11 each formed by a pair of parallel, upper 11a and lower 11b, sections sections, situated one above the other and connected by at least one metal wire 11c passing alternately from one to the other (see FIGS. 13 and 14). In the case of FIG. 3, the panel has two stiffener elements 11 whose lower sections 11b are connected by a metal wire; the framework of the panel then has the shape of a frame and can ensure a better holding of the panel in its central portion. FIG. 4 illustrates the case of a framework constituted by upper metal sections 12a, and lower ones 12b, parallel with one another, but staggered and connected in succession one with the other by metal wires. Each stiffener element may, as is known in the case of concrete beams, and as represented at 13 in FIG. 5, be formed of three metal sections, two lower sections 13b each connected to an upper section 13a by metal wires 13c.

Preferably, the metal stiffener elements coated with insulating material are subjected to an anti-corrosion protective treatment.

The stiffener elements may be other than metal and may be constituted for example by planks 14 (FIG. 6), of wood or plywood, with or without cutouts, extending vertically throughout the thickness of the panel.

Figure 7:
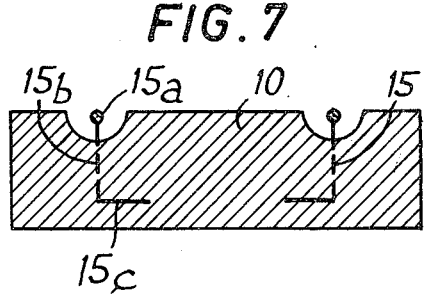

The stiffener elements may be formed from metal sheet, preferably perforated to improve its binding with the insulating material. In the case of FIG. 7, each stiffener element is constituted by a metal sheet 15 bent at a right angle, whose vertical portion 15b bears at its upper end a metal section 15a and whose lower horizontal portion 15c embedded in the insulating material contributes towards the improvement of the performance in bending of the part of the panel situated between the stiffener elements. FIG. 8 illustrates stiffener elements each formed by a metal sheet 16 folded in the manner of a V (or an open tube) with its apex 16a at the top and its lower ends 16b embedded in the insulating material and folded back upwards.

The framework of the panel may also be constituted by one element only, for example a box 17, of metal or a glass-fibre reinforced plastic material, with a section in the form of an upturned U (FIG. 9), with its central portion flush with the upper face of the panel, or by a curved perforated metal sheet 18 (FIG. 10) whose bottom edges 18b are folded upwards.

FIGS. 1 to 10 illustrate panels which may be used as flooring elements.

As represented in FIGS. 1 to 5, 7 and 8, the upper portion 11a, 12a, 13a, 15a, 16a of each stiffener element, said upper portion constituting the framework working in compression incorporated in a concrete slab cast on the floor, is removed from the insulating material 10. This framework in compression is situated in a groove formed on the upper face of the panel, with a cross-section as a half circle, 21, (FIGS. 1, 4, 5, 7) or V-shaped, 22 (FIG. 3). This framework may also be released as a consequence of the shape of the panel (FIG. 2).

Figure 6:
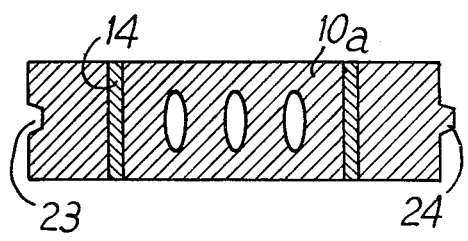

The panels may be provided, along their lengthwise edges, with a groove 23 and a rib 24, complementary in shape, to permit the assembly of neighboring panels by connection of the tenon and mortise type along their adjacent edges (FIGS. 6 and 9). There may alternatively simply be provided a groove 25 along each lengthwise edge of the panel (FIG. 10), the fitting of adjacent panels being done by means of a longitudinal bar 28 introduced into the grooves 25 of their edges in contact (FIG. 16).

As appears in FIGS. 15 and 16, the framework passes out of the insulating material to the transverse ends of the panel in the form of caps 60, 61 so as to form parts supporting the panel receiving ties intended to constitute a clamping means.

The projecting ends, or caps, 60, 61, may be formed by the prolongations of the elements stiffening or compressing the framework or may be added by welding on said stiffening or compression elements. The caps 60, 61 are preferably bent and support primary metal connecting shapes 62, 63, welded respectively to the upper caps 60 and lower caps 61, and presenting a length equivalent to the transverse dimension of the panel, as well as metal shapes in waiting 64, 65, short in length, not welded, which are intended to serve as connection between two clamping portions corresponding to two adjacent panels.

For the purpose of finishing or protection against fire, the panel may, after having been mounted in position, be given a coating, for example of plaster, on its internal face, or support an internal plate or lattice, or again a suspended ceiling. Thus, it is advantageous to provide, at the bottom surface of the panel, Ω-shaped grooves for hooking a coating, 26, (FIG. 1), or dovetail shaped, 27, (FIG. 3). These grooves may be made during production or after moulding, for example, for grooves 26, by remelting the insulating material with hot wires. As an alternative, a protection plate 29 (FIG. 4) may be positioned under the bottom face of the panel at the time of the production by moulding of the block of insulating material.

The making of a panel according to the invention with a framework such as that of the block represented in FIG. 1, may be achieved by forming, at the bottom of the grooves 21, grooves 31 in a prefabricated block 30 of insulating material (FIG. 11), and then placing the elements 11 constituting the framework into said grooves and immobilising these elements by means of the introduction of a filler 32 into the grooves, said filler being also, if desired, an expanded insulating material.

Preferably, the panel according to the invention is made by moulding the insulating material 10 around the framework.

Said moulding may be carried out in a mould in which elements constituting the framework have already been placed. It is then even possible, as illustrated in FIG. 12, to mould in one operation a composite block from which several panels, with different frameworks 11, 13, 14, may be obtained by cutting out, the cutout lines being diagrammatically represented in broken lines in FIG. 12. Provision for the grooves such as 21 or 22 is effected before moulding by masking the elements of the framework which have to be free in those grooves, said masking being made for example by means of flanges 33, 34 (FIG. 12) which cover the upper profiled elements of the frameworks 11 and 13.

The moulding of the insulating material around the framework is preferably carried out in semi-continuous or continuous manner.

FIG. 13 illustrates diagrammatically a semi-continuous installation for the production of panels according to the invention.

This installation comprises, as known per se for the production of ordinary blocks of insulating material, a moulding cavity 40 into which beads 41 of pre-expanded polystyrene are introduced, and an ejection piston 42 for expelling in each case, through the side outlet 40a of the cavity 40, the section of block formed in the moulding cavity, a continuous block being collected on band conveyors 43 and then roller conveyors 44. According to the invention, the elements of the framework, in the illustrated example, elements 11, are introduced into the moulding cavity 40 through its side wall opposite the outlet 40a.

The elements 11 are introduced section by section, each time in a length equal to that of the moulding cavity.

It is possible to use continuous elements 11a and 11b, the panels being then obtained by cutting out, or elements 11a and 11b whose length corresponds to that of the panel to be produced.

The masking of the upper profiled elements 11a is effected by means of flanges or beads (not represented) similar to those 33 and 34 of FIG. 12. A masking of the ends, forming supporting parts, of the elements of the framework may be effected by means of a pad 35.

Preferably, to prevent condensation of the steam used for the expansion of the polystyrene and to improve the bond between insulating material and framework, the elements of the latter pass through a heated area 45 to be preheated before they enter the moulding cavity.

FIG. 14 illustrates diagrammatically an installation for the continuous production of panels according to the invention.

This installation comprises, as known per se for the production of blocks of insulating material, a conveyor belt 50, a device 51 feeding pre-expanded polystyrene overhanging the belt 50 to form a mat of pre-expanded polystyrene on the latter, an area 53 for the expansion of the polystyrene continuously deposited on the belt 50 and a device 54 comprising two endless belt conveyors superimposed to give final shape to the expanded polystyrene continuously issuing from the expansion area.

In accordance with the invention, the elements of the framework, for example metal sections 11a and 11b, which may be preheated and fitted with masking elements, are continuously introduced at the inlet of the moulding device lying on a conveyor 52 situated immediately upstream of the conveyor belt 50.

As in the case of semi-continuous production it will be possible to use framework elements cut to the desired length before their introduction into the moulding device of the insulating material, or continuous elements, the panels being obtained by cutting out from the continuous block 55 issuing from the installation.

In order to facilitate the casting of a concrete slab on a floor formed of an assembly of panels in accordance with the invention, it is possible to cover either of the two upper and lower faces 10', 10" of a panel 10 by means of a lattice 70 intended to form a reinforcement for the compression slab which must be cast on an assembly of adjacent panels. The lattice 70 intended to receive the upper face 10' of a panel, and which may be, for example, of steel, is welded to the free parts of the stiffeners, or compression elements, such as 11a, 12a, 13a, 15a, 16a of the panel framework. The meshes of the lattice may have transversal dimensions for example of the order of 10 to 30 cm.

The lattice 70 covering the face 10" of a panel 10 not provided with compression elements not coated with insulated material may be connected to the lattice 70 welded on the stiffeners acting as compression elements such as 13a through cross-ties 72 constituted by metal wires going through the insulating material and joining parts of lattice covering each of the faces 10', 10". Ties 73 may also connect the lattice 70 of the face 10" to the coated stiffeners such as 13b.

In advantageous manner, the lattice 70 is provided, in the vicinity of a longitudinal edge 10c of the panel 10 with a section 71, adapted to fold down, connected to the lattice 70 about an axis 74 parallel with the edge 10c and adapted to pivot by about 180° about the axis 74. The width of the folding down section 71 is greater than the distance between the axis 74 and the edge 10c in such a manner that, at the time of the positioning of the panels 10, the folding-down section 71 can cover the joint between two adjacent panels 10 (see in FIG. 16 the lower folding-down portion 71 extended in working position).

For the transport of the panels 10, the section 71 is advantageously folded onto the central part of the lattice 70 by pivoting about the axis 74 (see FIG. 16, with the upper folding-down section 71 pivoting along the direction of the arrow to reach the rest position parallel with the lattice 70).

A panel according to the invention such as that represented on FIGS. 15 to 17 comprises at the same time an insulating element, stiffener or bearing elements forming a frame-work, bent irons or caps disposed at the end of the panels to form tie-iron supports, tie-irons, a lattice covering the upper face of the panel to form a compression slab reinforcement, and a lattice or the like covering the bottom face of the panel to form a lower-face coating reinforcement. With the aid of such a self-bearing panel, able to be produced in its entirety in a workshop, the construction, for example, of a floor on site is limited to extremely simple operations of panel assembly by the mere juxtaposition, and casting concrete.

Naturally, several modifications or additions may be introduced into the methods of embodiment hereinabove described of a panel in conformity with the invention and its process of manufacture, without on that account departing from the scope of the invention defined by the attached claims.

I claim:

1. In a prefabricated building panel for use as a floor element of the type having a block of insulating expanded polymer material and a reinforcement structure, wherein said reinforcement comprises:
   (a) stiffener elements completely embedded in said block of expanded polymer material;
   (b) compression elements not coated with insulating material, said compression elements freely extending longitudinally in grooves formed on the upper face of said block;
   (c) means for connecting said stiffener elements to said compression elements; and
   (d) projections on said stiffener and compression elements at the ends of the panel to form supporting portions of the panel, and wherein said projections support first connecting elements which extend substantially along the entire length of the end of the panel and are attached to said projections and second connecting elements of shorter length which are movable with respect to said projections for interconnecting projections of adjacent panels.

2. A prefabricated self-supporting insulating building panel for use as a floor element, constituted by a block of insulating expanded polymer material and a reinforcement structure, wherein said structure comprises:
 (a) stiffener elements extending longitudinally through the blocks of insulating material and projecting outside said block at the ends of the panel, the portion of said stiffener elements extending through said block being completely embedded in said block of expanded polymer material;
 (b) compression elements in spaced relationship with respect to said insulating material, said compression elements extending longitudinally in grooves formed on the upper face of said block and projecting at the ends of the panels, the projections of said stiffener and compression elements forming supporting portions for the panel and being connectable to projections of an adjacent panel;
 (c) means for connecting said stiffener elements to said compression elements; and
 (d) at least a lattice reinforcement element not coated with insulating material and covering the upper face of the panel, said lattice element being attached to said compression elements.

3. A panel as claimed in claim 2, wherein said stiffener and compression elements comprise respectively the lower and upper portions of truss elements.

4. A prefabricated building panel for use as a floor element, constituted by a block of insulating expanded polymer material and a reinforcement structure, wherein said reinforcement structure comprises:
 (a) stiffener elements completely embedded in said block of expanded polymer material;
 (b) compression elements not coated with insulating material, said compression elements freely extending longitudinally in grooves formed on the upper face of said block;
 (c) means for connecting said stiffener elements to said compression elements;
 (d) at least a lattice reinforcement element not coated with insulating material and covering the upper face of the panel, said lattice element being attached to said compression elements; and
 (e) projections on said stiffener and compression elements at the ends of the panel to form supporting portions of the panel, and wherein said projections support first connecting elements which extend substantially along the entire length of the end of the panel and are attached to said projections and second connecting elements of shorter length which are movable with respect to said projections for interconnecting projections of adjacent panels.

5. A prefabricated building panel for use as a floor element, constituted by a block of insulating expanded polymer material and a reinforcement structure, wherein said reinforcement structure comprises:
 (a) stiffener elements completely embedded in said block of expanded polymer material;
 (b) compression elements not coated with insulating material, said compression elements freely extending longitudinally in grooves formed on the upper face of said block;
 (c) means for connecting said stiffener elements to said compression elements;
 (d) at least a lattice reinforcement element not coated with insulating material and covering the upper face of the panel, said lattice element being attached to said compression elements; and
 (e) an additional portion lattice pivotally connected with said lattice element about an axis extending parallel to a side edge of the panel and spaced from said side edge by a distance shorter than the width of said additional portion measured perpendicularly to said axis, whereby said additional portion can pivot about said axis to fold down, in a rest position, onto said lattice reinforcement element, and to open out, in a work position, so as to extend parallel with said lattice reinforcement element beyond said side edge to cover the joint between two adjacent panels.

6. A panel as claimed in claim 5 further comprising projections on said stiffener and compression elements at the ends of the panel to form supporting portions of the panel, and wherein said projections support first connecting elements which extend substantially along the entire length of the end of the panel and are attached to said projections and second connecting elements of shorter length which are movable with respect to said projections for interconnecting projections of adjacent panels.

7. A panel as claimed in claim 2, wherein said projections support first connecting elements which extend substantially along the entire length of the end of the panel and are attached to said projections and second connecting elements of shorter length which are movable with respect to said projections for interconnecting projections of adjacent panels.

8. A panel as claimed in claim 2, wherein an additional portion lattice is pivotally connection with said lattice element about an axis extending parallel to a side edge of the panel and spaced from said side edge by a distance shorter than the width of said additional portion measured perpendicularly to said axis, whereby said additional portion can pivot about said axis to fold down, in a rest position, onto said lattice reinforcement element, and to open out, in a work position, so as to extend parallel with said lattice reinforcement element beyond said side edge to cover the joint between two adjacent panels.

9. A panel as claimed in claim 8, wherein said projections support first connecting elements of the panel and are attached to said projections and second connecting elements of shorter length which are movable with respect to said projections for interconnecting projections of adjacent panels.

* * * * *

UNITED STATES PATENT AND TRADEMARK OFFICE
CERTIFICATE OF CORRECTION

PATENT NO. : 4,157,640
DATED : Jun. 12, 1979
INVENTOR(S) : Andre A. Joannes

It is certified that error appears in the above-identified patent and that said Letters Patent are hereby corrected as shown below:

In the page on which the abstract appears, and in the left hand column thereof between lines [22] and [51], insert:

--[30] Foreign Application Priority Data

Aug. 12, 1976 [FR] France ......... 76 24675--

Signed and Sealed this

Tenth Day of June 1980

[SEAL]

Attest:

SIDNEY A. DIAMOND

Attesting Officer

Commissioner of Patents and Trademarks